US012570066B2

(12) United States Patent
Roland

(10) Patent No.: US 12,570,066 B2
(45) Date of Patent: Mar. 10, 2026

(54) SYSTEM AND METHOD FOR FORMING A COMPRESSED SUBSTRATE HAVING A GENERALLY UNIFORM DENSITY FROM POWDERS

(71) Applicant: Edward J. Roland, Trenton, NJ (US)

(72) Inventor: Edward J. Roland, Trenton, NJ (US)

( * ) Notice: Subject to any disclaimer, the term of this patent is extended or adjusted under 35 U.S.C. 154(b) by 134 days.

(21) Appl. No.: 18/658,803

(22) Filed: May 8, 2024

(65) Prior Publication Data

US 2024/0375367 A1 Nov. 14, 2024

Related U.S. Application Data

(60) Provisional application No. 63/465,085, filed on May 9, 2023.

(51) Int. Cl.
*B30B 15/30* (2006.01)
*B22F 3/03* (2006.01)

(52) U.S. Cl.
CPC .............. *B30B 15/308* (2013.01); *B22F 3/03* (2013.01); *B22F 2998/10* (2013.01)

(58) Field of Classification Search
CPC ....... B29C 43/006; B29C 43/34; B29C 43/46; B30B 11/02; B30B 11/022; B30B 11/08; B30B 11/085; B30B 11/34; B30B 15/308; B30B 15/065; B30B 15/0023; B30B 15/32
See application file for complete search history.

(56) References Cited

U.S. PATENT DOCUMENTS

| | | | | |
|---|---|---|---|---|
| 2,932,852 | A | 4/1960 | Melville et al. | |
| 3,010,148 | A | 11/1961 | Dasher | |
| 3,017,665 | A | 1/1962 | Dasher et al. | |
| 3,144,681 | A | 8/1964 | Tibor et al. | |
| 3,242,530 | A | 3/1966 | Hirsch et al. | |
| 3,298,060 | A | 1/1967 | Michalak | |
| 3,729,281 | A * | 4/1973 | Okubo | B30B 11/022 425/432 |

(Continued)

FOREIGN PATENT DOCUMENTS

| | | | |
|---|---|---|---|
| BR | 112016002433 | A2 | 8/2017 |
| DE | 102004027563 | A1 | 12/2005 |

(Continued)

*Primary Examiner* — Thu Khanh T. Nguyen

(74) *Attorney, Agent, or Firm* — LaMorte & Associates P.C.

(57) ABSTRACT

A system and method for processing powdered materials. The system has a first roller, a second roller, and a compression zone for compressing the powdered material between the rollers. At least one oscillating guide plate is provided that has a curved edge that face the first roller. A curved channel is formed between the curved edge and the first roller. The curved channel tapers from a wide entrance opening to a narrower exit opening. The exit opening leads into the compression zone between the rollers. The curved channel receives the powdered material and compresses the powdered material as the powdered material advances. However, due to the curvature of the curved channel, the powdered material is sheared as it is transitioned and redistributed to the narrower cross section while gaining uniformity of flow and density. The result is that a compressed powdered material with generally uniform density.

18 Claims, 8 Drawing Sheets

(56) References Cited

U.S. PATENT DOCUMENTS

| | | | |
|---|---|---|---|
| 3,730,659 | A | 5/1973 | Smith et al. |
| 3,734,659 | A | 5/1973 | Harris |
| 3,890,080 | A | 6/1975 | Cotts |
| 4,111,626 | A | 9/1978 | Funakoshi et al. |
| 4,144,009 | A | 3/1979 | Jackson et al. |
| 4,167,377 | A | 9/1979 | Oakley |
| 4,231,729 | A | 11/1980 | Tundermann et al. |
| 5,066,211 | A | 11/1991 | Wunder et al. |
| 5,066,441 | A | 11/1991 | Gerard |
| 5,515,740 | A | 5/1996 | Gamberini |
| 5,517,871 | A | 5/1996 | Pento |
| 5,547,357 | A | 8/1996 | Bergendahl |
| 5,596,865 | A | 1/1997 | Kramer |
| RE35,506 | E | 5/1997 | Solazzi et al. |
| 5,648,610 | A | 7/1997 | Laine |
| 5,661,249 | A | 8/1997 | Rupp et al. |
| 5,671,262 | A | 9/1997 | Boyer et al. |
| 5,678,166 | A | 10/1997 | Piehler et al. |
| 5,796,051 | A | 8/1998 | Chiari et al. |
| 5,958,467 | A | 9/1999 | Coble et al. |
| 5,971,038 | A | 10/1999 | Fiedler et al. |
| 5,989,487 | A | 11/1999 | Yoo et al. |
| 6,001,304 | A | 12/1999 | Yoo et al. |
| 6,079,284 | A | 6/2000 | Yamamoto et al. |
| 6,106,262 | A | 8/2000 | Levin et al. |
| 6,187,087 | B1 | 2/2001 | Yoo et al. |
| 6,234,744 | B1 | 5/2001 | Cawley |
| 6,257,079 | B1 | 7/2001 | Mueller |
| 6,260,419 | B1 | 7/2001 | Kramer |
| 7,247,013 | B2 | 7/2007 | Roland |
| 7,534,381 | B2 | 5/2009 | Haldar et al. |
| 7,959,837 | B2 | 6/2011 | Andrews et al. |
| 8,382,859 | B2 | 2/2013 | Wiggins, Sr. |
| 2010/0252957 | A1 | 10/2010 | Andrews et al. |
| 2011/0180950 | A1 * | 7/2011 | Heinrich ............... B30B 11/022 425/150 |
| 2022/0297868 | A1 | 9/2022 | Garthaffner et al. |

FOREIGN PATENT DOCUMENTS

| | | | |
|---|---|---|---|
| DE | 102010018420 | B4 | 10/2017 |
| JP | 2014069173 | A | 4/2014 |
| WO | WO2019057802 | A1 | 3/2019 |
| WO | WO2020118181 | A1 | 6/2020 |

* cited by examiner

SYSTEM AND METHOD FOR FORMING A COMPRESSED SUBSTRATE HAVING A GENERALLY UNIFORM DENSITY FROM POWDERS

RELATED APPLICATIONS

This application claims priority rights of the U.S. Provisional Patent Application No. 63/465,085 filed May 9, 2023.

BACKGROUND OF THE INVENTION

1. Field of the Invention

In general, the present invention relates to industrial processing machines that are used to form powder into compressed substrates or ribbons that are later granulized into particles of a particular size. More particularly, the present invention relates to systems that can form powders into a compressed substrate that has a density throughout its form that falls within a controlled range.

2. Description of the Prior Art

In many industries, dry granulated materials are utilized in the production of products. For example, in the pharmaceutical industry, dry compounds are often mixed and granulated before being formed into tablets. Similarly, in the manufacture of batteries, dry mixtures are granulated for use in the formation of cathode pellets. Regardless of the eventual use of the granulated material, the formation of the granulated material is typically made by mixing the required materials together in powdered form. The dry mix is then compacted into a substrate or ribbon. The compacted substrate is then subsequently granulated to produce granulated particles for use in production. If the size and density of the granulated particles is important in the production process, then the granulated particles are typically mechanically filtered to remove any particle that is too large or too small for use in production. Granulated particles that are too large or too small must be disposed of or reworked, therein complicating the production procedure. The use of mechanical filtering is good for collecting granulated particles of the same general size, but it does little to separate granulated particles of different densities. Accordingly, the issue of density is addressed in the process of forming the compressed substrate that is granulated. If the compressed substrate has a generally uniform density, then particles made from that compressed substrate will also have the same generally uniform density.

Having particles of a comparable size and density can be critical in many manufacturing processes. For example, in forming pharmaceutical tablets, the use of granulated particles having the same general size and density ensures that each of the tablets made contains the same amounts of active ingredients. The use of granulated particles having the same general size and density also ensures that each tablet will dissolve in the body at the same general rate, therein administering the active ingredients evenly over time.

Obtaining granulated particles of a controlled particle size can be achieved using mechanical filtration techniques. However, controlling the density of the granulated particles is more problematic. This is especially true if the powdered materials being combined have a high degree of particle cohesion. If the particles are highly cohesive, they form clumps when pressed together. If the powdered material is stirred or moved by an auger, the blades of the stirrer or auger produce localized areas of higher compressive forces that produce clumps of higher density in the powdered material. Likewise, if the powder material is compressed in a roller compactor, when static roll side seal are used, the compacted ribbon's ends tends to be less dense next to the side seals than at the center of the ribbon. Conversely, when roller attached rotating dam ring side seals are used, the compacted ribbon's ends tends to be more dense next to the side seal than at the center of the ribbon.

In U.S. Pat. No. 7,247,013 to Roland, a processing machine is disclosed that subjects powdered material to shear forces prior to passing through the rollers of a roller compactor. The shear forces disrupt the material and help disperse areas of uneven density prior to roller compression. Although the Roland system is effective, it leaves room for improvement.

The present invention improves upon the system shown in U.S. Pat. No. 7,247,013 by disrupting the powdered material with mechanical contact in addition to applying shear forces. The improved system also prevents undesirable pressures created by powder backflow buildup. These improvements are embodied by the present invention as described and claimed below.

SUMMARY OF THE INVENTION

The present invention is a system and method for processing powdered materials. The system has a first roller and a second roller. A compression zone for compressing the powdered material is disposed between the first roller and the second roller.

At least one oscillating guide plate is provided. Each guide plate has a curved edge that face the first roller. Accordingly, a curved channel is formed between the curved edge of each oscillating guide plates and the first roller. The curved channel tapers from a wide entrance opening to a narrower exit opening. The exit opening leads into the compression zone between the rollers.

The curved channel receives the powdered material and both shears and redistributes the powdered material as the powdered material advances from the wide entrance to the narrower exit. Furthermore, since part of the curved channel is made from one or more oscillating plate edges, the oscillation further shears the powdered material as it is advanced and transitioned to a thin rectangular cross section, while maintaining the powder's ability to redistribute to a more uniform density. The result is that a ribbon of powdered material with generally uniform density is produced and fed into the compression Nip zone between the rollers. The roller applies even compression to the powdered material, resulting in a compressed substrate of generally uniform density.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention powder processing machine and methodology can be embodied in many ways, only a few exemplary embodiments are illustrated. The exemplary embodiments are shown for the purposes of explanation and description. The exemplary embodiments are selected in order to set forth some of the best modes contemplated for the invention. The illustrated embodiments, however, are merely exemplary and should not be considered limitations when interpreting the scope of the appended claims.

Figure 1:
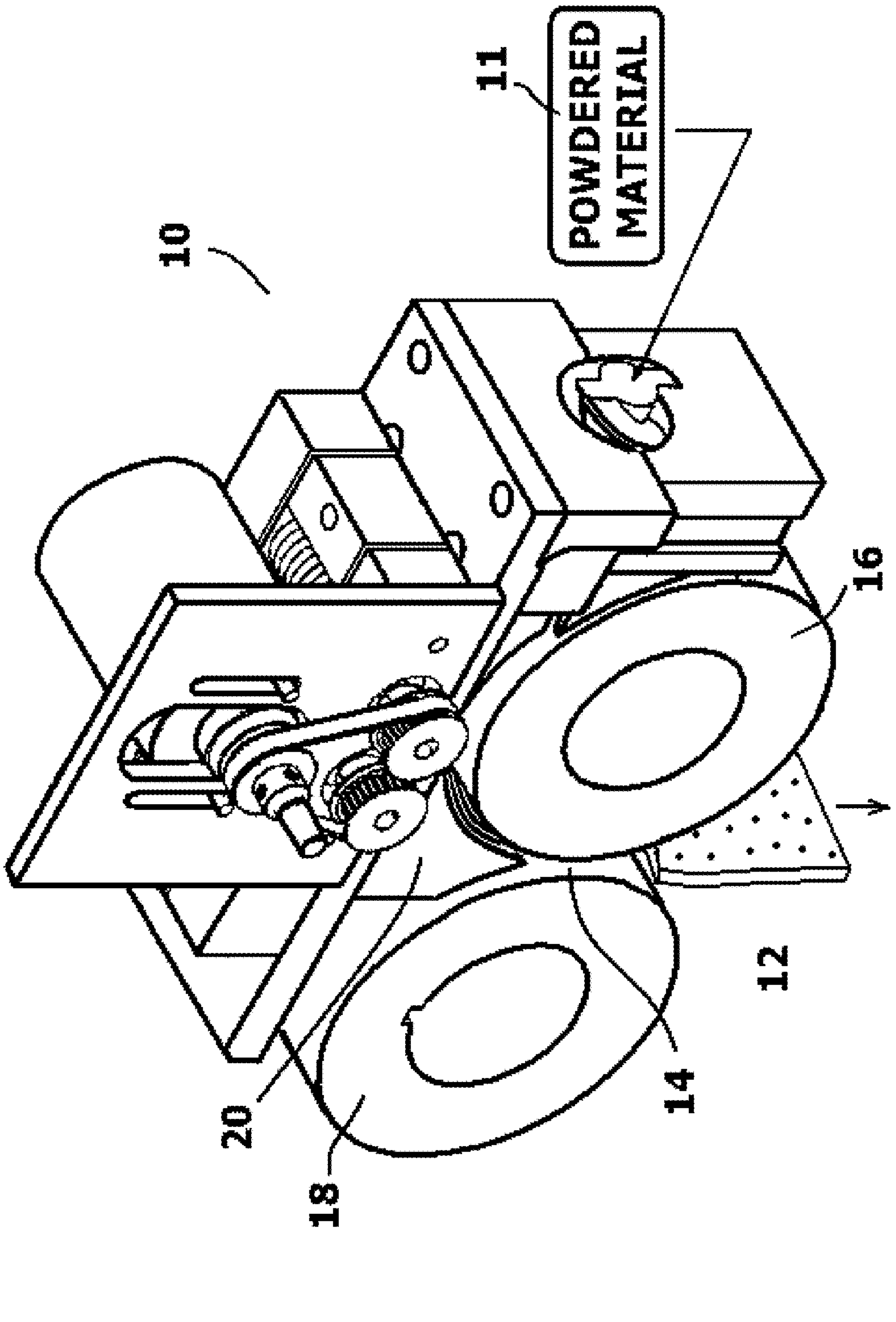
FIG. 1 is perspective view of an exemplary embodiment of a powdered material processing machine.
Figure 2:
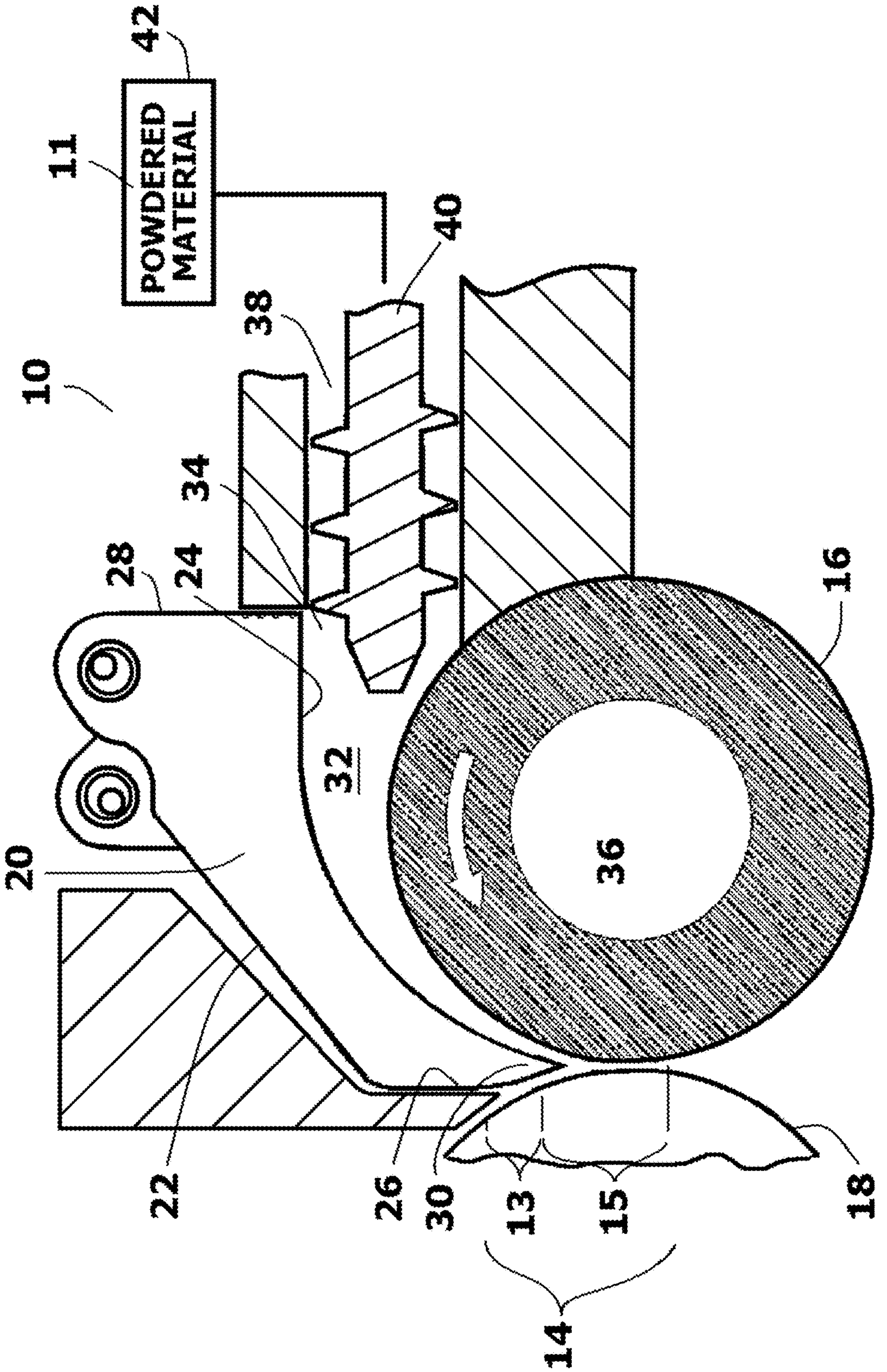
FIG. 2 is a sectional view of the exemplary embodiment of FIG. 1, viewed along section line 2-2.

Referring to FIG. 1 in conjunction with FIG. 2, a powder processing machine 10 is shown. The purpose of the powder processing machine 10 is to compresses powdered material 11 into a continuous compressed substrate 12 or ribbon for use in further processing by other machines. The powdered material 11 is compressed in such a way that the density of powdered material 11 throughout the compressed substrate 12 falls within a narrow range, therein making the compressed substrate 12 uniformly dense within a known margin of error.

The powder processing machine 10 is a variant of a roller compactor. In a roller compactor, material is compressed between two rollers. Using terms of art, a roller compactor has a nip zone between the rollers where the material being worked is moving at the same speed as the rollers. Just prior to the nip zone is a slip zone, where the material being worked begins to accelerate to the speed of the roller. In the powder processing machine 10, there is a slip zone 13 that approaches the two opposing rollers 16, 18 and nip zone 15 that is between the two opposing rollers 16, 18. In combination, the slip zone 13 and the nip zone 15 are herein referred to as the compression zone 14 of the powder processing machine 10. The powdered material 11 is compressed in a compression zone 14. The opposing rollers 16, 18 include a first roller 16 and a second roller 18 that rotate in opposite directions. Either one or both of the opposing rollers 16, 18 can be powdered and caused to rotate. The speed of rotation is controlled for a purpose that is later explained.

In the first exemplary embodiment of the powder processing machine 10, a plurality of oscillating guide plates 20 are disposed above the first roller 16. Each of the oscillating guide plates 20 is a planar plate defined within four primary side edges. Each guide plate 20 has a top edge 22, a bottom contact edge 24, a forward edge 26 and a distal edge 28. Within the powder processing machine 10, the contact edge 24 faces the first roller 16. The contact edge 24 is curved and extends from the forward edge 26 to the distal edge 28. The contact edge 24 meets the forward edge 26 at a sharpened salient point, therein forming an agitation tooth 30 on each oscillating guide plate 20. Each agitation tooth 30 is disposed just above the compression zone 14 between the first roller 16 and the second roller 18.

The curvature of the contact edge 24 on each oscillating guide plate 20 is longer and larger than the external curvature of the first roller 16. Consequently, the contact edge 24 near the forward edge 26 is closer to the first roller 16 than is the contact edge 24 near the distal edge 28. As a result, a curved channel 32 is formed between the first roller 16 and the contact edges 24 of the oscillating guide plates 20. The curved channel 32 is defined by the exterior of the first roller 16 and the multiple contact edges 24 of the oscillating guide plates 20. The curved channel 32 is tapered in addition to being curved. The curved channel 32 has a wide entrance opening 34 under the distal edges 28 of the oscillating guide plates 20 and a much narrower exit opening 36 under the forward edges 26 of the oscillating guide plates 20. The exit opening 36 feeds directly into the compression zone 14 between the first roller 16 and the second roller 18.

The wide entrance opening 34 of the curved channel 32 leads into a supply conduit 38. The supply conduit 38 contains an auger screw 40 or similar mechanism that can actively advance material from the supply conduit 38 to the curved channel 32. The supply conduit 38 is connected to an external hopper 42 that holds and supplies the powdered material 11.

Figure 3:
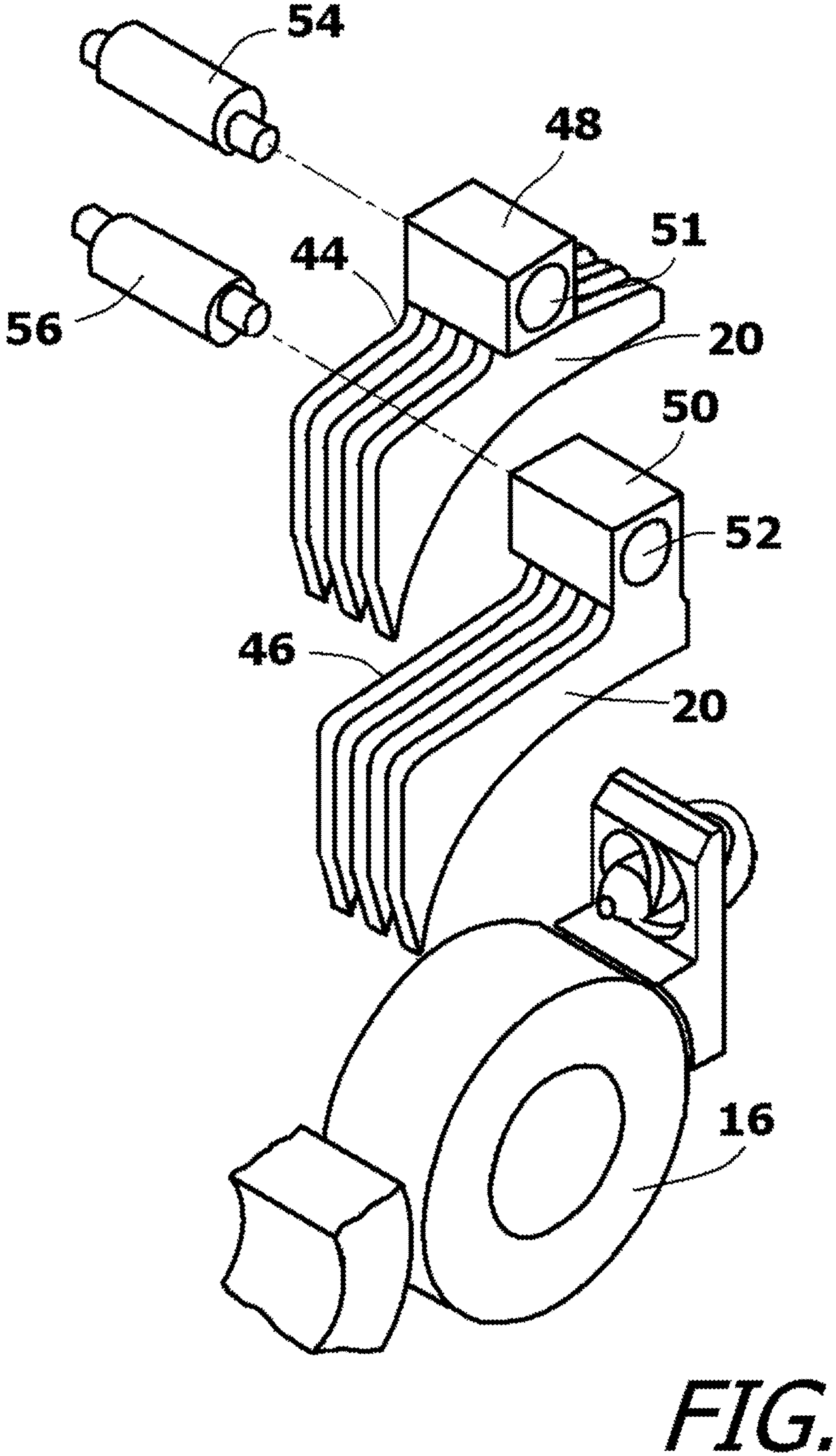
FIG. 3 is an exploded view of the components creating the curved channel within the exemplary embodiment of the powdered material processing machine.

Referring to FIG. 3 in conjunction with FIG. 2, and FIG. 1, it can be seen that each of the oscillating guide plates 20 is part of a larger plate set. In the shown embodiment, there are two plate sets 44, 46 wherein each of the plate sets 44, 46 contains multiple guide plates 20 that are parallel and articulate together as a unit. On each plate set 44, 46 the guide plates 20 are parallel and spaced. The oscillating guide plates 20 from the first plate set 44 and the second plate 46 are shaped and sized to closely intermesh. The oscillating guide plates 20 in the first plate set 44 are joined to a first mounting head 48. Likewise, the guide plates 20 in the second plate set 46 are joined to a second mounting head 50. Openings 51, 52 are formed through the mounting heads 48, 50 that are sized to receive eccentric drive shafts 54, 56.

Figure 4:
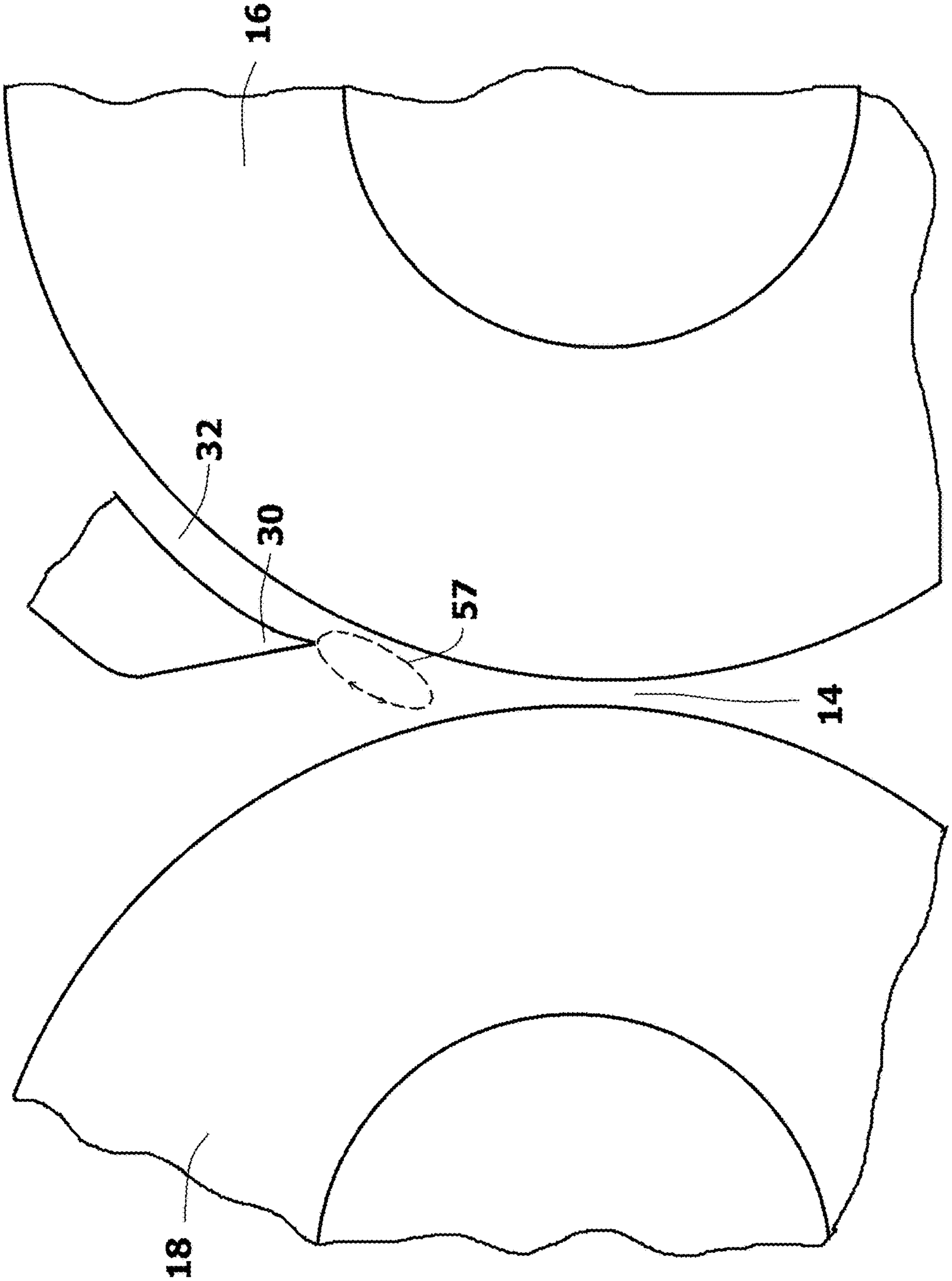
FIG. 4 is a schematic showing the oscillation motion of the guide plates used in forming part of the curved channel of FIG. 2.

The eccentric drive shafts 54, 56 are rotated either in the same direction or in opposite directions to move the oscillating guide plates 20. As the eccentric dive shafts 54, 56 rotate, they function as cams and articulate the first plate set 44 and the second plate set 46 both up and down and back and forth. Referring to FIG. 4 in conjunction with FIG. 3, it can be seen that the oscillations created by the rotation of the eccentric shafts 54, 56 causes each agitation tooth 30 to move along an engineered path 57. Each agitation tooth 30 can move either clockwise or counterclockwise along the engineered path 57, depending upon the rotational direction applied to the eccentric shafts 54, 56. As each agitation tooth 30 moves through the engineered path 57, each agitation tooth 30 periodically passes into the curved channel 32 within the compression zone 14. In the preferred embodiment, the oscillation of the guide plates 20 on the first plate set 44 is out of phase with the oscillation of the guide plates 20 on the second plate set 46. In this manner, the oscillating guide plates 20 in the first plate set 44 move relative to the guide plates 20 in the second plate set 46 during the operation of the powder processing machine 10.

Figure 5:
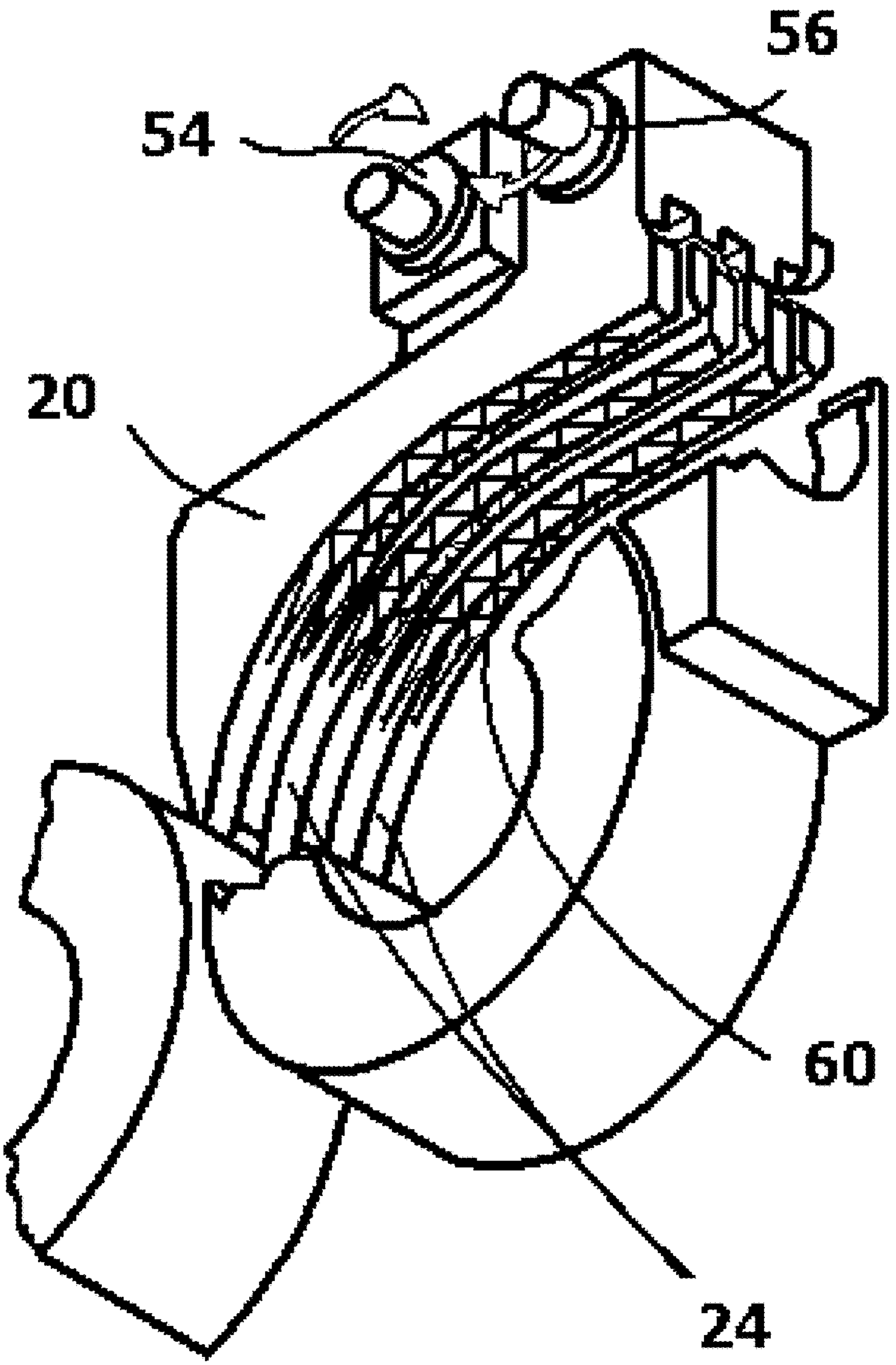
FIG. 5 is a reverse view of the guide plates to show texturing on the contact edges that face the curved channel shown in FIG. 2.

Referring to FIG. 5 in conjunction with FIG. 2, it can be seen that the contact edges 24 of the guide plates 20 need not be smooth. Rather, the contact edges 24 can be textured with wedge protrusions 60 that extend into the curved channel 32. Since the guide plates 20 are articulated by the eccentric drive shafts 54, 56, the wedge protrusions 60 repeatedly extend into the curved channel 32 and move relative to the first roller 16, therein altering the shape of the curved channel 32 during the operation of the powder processing machine 10.

Figure 6:
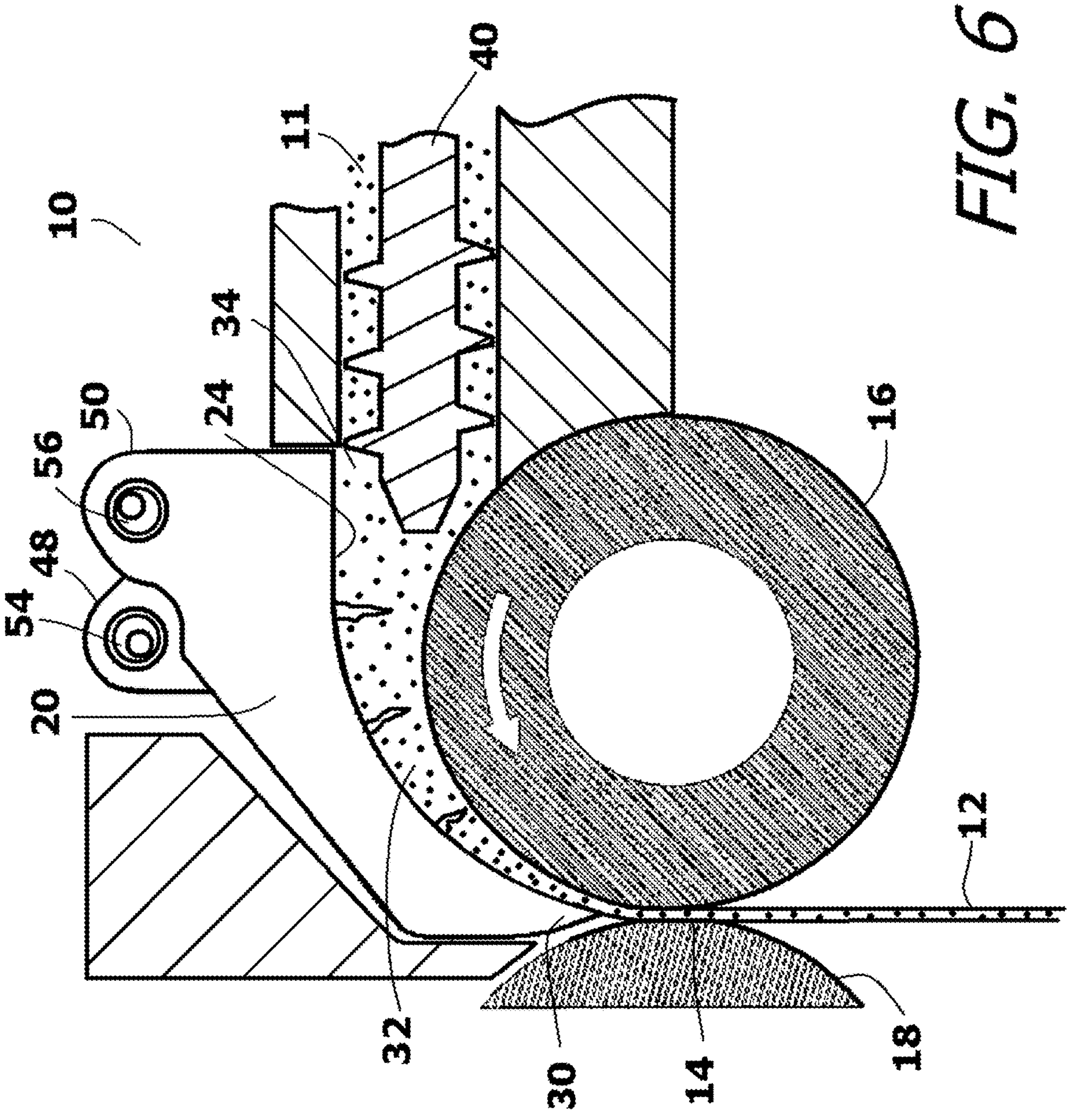
FIG. 6 is the sectional view of FIG. 2 shown while processing a powdered material.

Referring now to FIG. 6 in conjunction with FIG. 2 and FIG. 3, it can be seen that the auger screw 40 feeds powdered material 11 into the wide entrance opening 34 of the curved channel 32. Since the auger screw 40 physically contacts and pushes the powdered material 11, the contacted areas of the powdered material 11 will be more dense than other areas. If the powdered material 11 is highly cohesive, the powdered material 11 may begin to clump in these higher density areas.

As the powdered material 11 is advanced into the curved channel 32, the powdered material 11 transitions from the round feed tube cross section to a thinning rectangular cross section by the converging taper of the curved channel 32. The top of the curved channel 32 that is defined by the contact edges 24 of the oscillating guide plates 20 is longer than the bottom of the curved channel 32 defined by the first roller 16. Furthermore, the first roller 16 rotates, therein advancing the powdered material 11 into the curved channel 32. As a result, the powdered material 11 at the bottom of the curved channel 32 travels faster than the powdered material 11 at the top of the curved channel 32. This produces significant shear forces in the powdered material 11 that shears the powdered material 11 at the same time the powdered material 11 is being redistributed in the curved channel 32.

Additionally, the powdered material 11 is being moved past the wedge protrusions 60 on the oscillating guide plates 20. This produces a continuous perturbing action that mechanically promotes flow and redistribution of the powdered material 11, therein causing uniformity of the density in the powdered material 11.

Lastly, as the powdered material 11 reaches the end of the curved channel 32, the powdered material 11 is engaged by the agitation tooth 30 on the each of the oscillating guide plates 20. Each agitation tooth 30 cuts into the powdered material 11 and pulls that material either forward or backward relative to the inherent flow of the powdered material 11. This shears the powdered material 11 at its point of thinnest cross-section. agitation tooth. The shearing eliminates clumps and other areas of high density, therein resulting in powdered material 11 that is nearly uniformly dense as it exits the curved channel 32. This uniformly dense powdered material 11 is then fed into the compression Nip zone 14 in between the first roller 16 and the second roller 18. The powdered material 11 is evenly compressed between the first roller 16 and the second roller 18. Since the powdered material 11 is uniformly dense entering the compression zone 14 and the powdered material 11 is uniformly compressed within the compression zone 14, the result is a compressed substrate 12 of uniform, or nearly uniform density.

Different powdered materials have different properties that may require fine adjustments to the powder processing machine 10 in order to operate properly. The articulation rate at which the guide plates 20 move can be selectively controlled by controlling the rotational speed of the eccentric drive shafts 54, 56. The rotational speed of the rollers 16, 18 are controlled as a function of the speed of the auger screw 40. In this manner, the flow of powdered material 11, by weight, into the curved channel 32 is matched to the flow of powdered material 11 entering the compression zone 14. The equal amounts of powdered material 11 entering and exiting the curved channel 32 prevents flow pressure variables from occurring and disrupting the uniform density of the powdered material 11 being processed.

Figure 7:
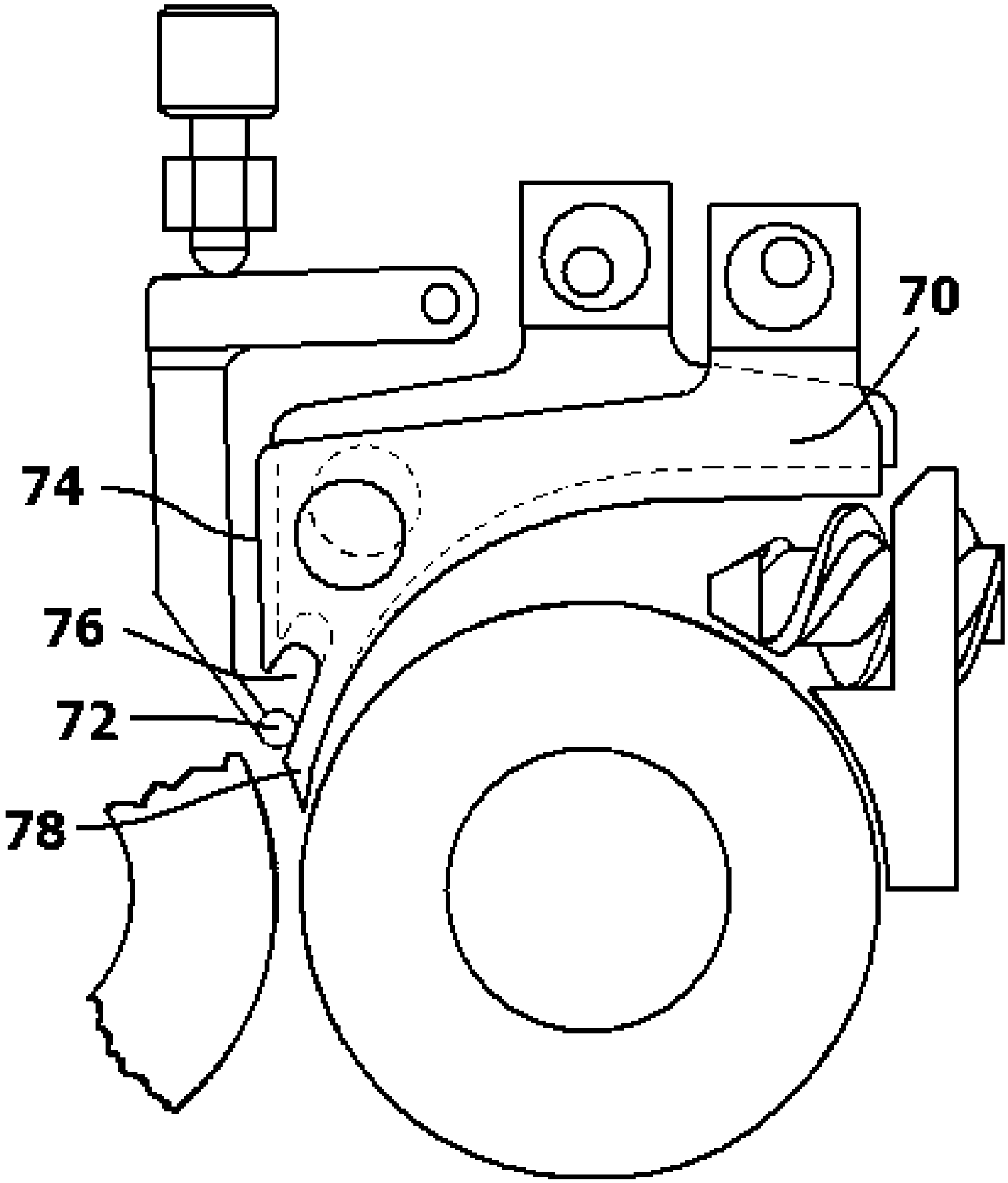
FIG. 7 shows an alternate embodiment of the oscillating guide plates, wherein a guide pin is used to control motion.

Both the first mounting head 48 and the second mounting head 50 pivot about the eccentric drive shafts 54, 56. As such, each agitation tooth 30 can be deflected by the powdered material 11 passing under the agitation tooth 30. Referring to FIG. 7, a variation of the oscillating guide plates 70 is shown. In this embodiment, a guide pin 72 is provided near the forward edge 74 of each oscillating guide plate 70. Slots 76 are formed into the forward edge 74 of each oscillating guide plate 70. The guide pin 72 passes into the slot 76. The presence of the guide pin 72 in the slot 76 both guides and limits the motion of the oscillating guide plate 70 and the agitation tooth 78 on each oscillating guide plate 70.

The guide pin 72 can be adjustable in position. By adjusting the position of the guide pin 72, the minimum and maximum distance between the agitation tooth 78 and the first roller 79 can be selectively adjusted. In this manner, the oscillating guide plates 70 can be finely adjusted to optimize the processing of different powdered materials. Furthermore, the guide pin 72 can have the form of a camshaft rather than a straight pin. This enables oscillating guide plates 70 of different plate sets to have slightly different movements, therein assisting the oscillating guide plates 70 agitate and shear the powdered material being contacted.

Figure 8:
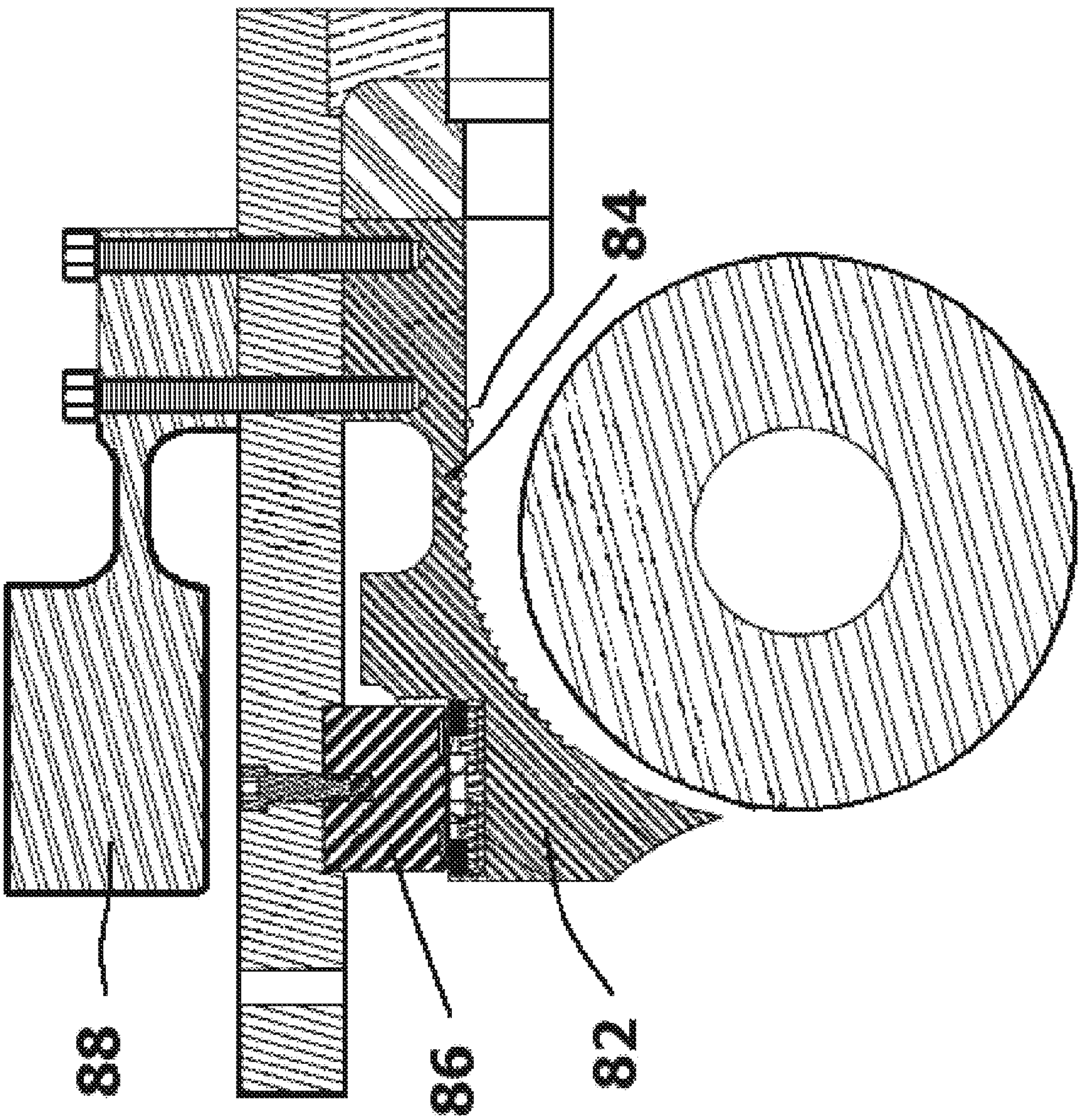
FIG. 8 shows an alternate embodiment where one oscillating guide plate is oscillated by an electromagnet.

In the previous embodiments, the movement of the various oscillating guide plates is created by rotating eccentric drive shafts. Such a drive mechanism is merely exemplary, and it should be understood that other movement systems can be utilized. For example, the oscillating guide plates can be moved by linkage arms, cams, or any other cyclical drive system. Furthermore, in previous embodiments, multiple oscillating guide plates are used to define the top surface of the curved channel that leads to the compression zone. The use of multiple guide plates is exemplary, and it should be understood that only one guide plate need be used, provided the guide plate is wide enough to fully define the top surface of the curved channel. Referring to FIG. 8, one such alternate system 80 is shown. In this embodiment, a single oscillating guide plate 82 is provided. The oscillating guide plate 82 has a flexible neck 84 that acts as a leaf spring and enables the oscillating guide plate to flex. An electromagnet 86 is provided that causes the oscillating guide plate 82 to move when activated. A counterweight 88 moves the oscillating guide plate 82 away from the electromagnet 86. When the electromagnet 86 is activated, the oscillating guide plate 82 move and the counterweight 88 is flexed. When the electromagnet 86 is deactivated, the counterweight 88 returns the oscillating guide plate 82 to its original position. Thus, by operating the electromagnet 86 with alternating current at a selected cycle frequency, the oscillating guide plates 82 can be caused to vibrate at that cycle frequency.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A system for processing powdered materials, comprising:
- a first roller;
- a second roller, wherein a compression zone is disposed between said first roller and said second roller;
- at least one guide plate having a curved edge that faces said first roller, wherein a curved channel is formed between said curved edge and said first roller, and wherein said curved channel tapers from a wide entrance opening to a narrower exit opening that extends into said compression zone;

wherein said at least one guide plate oscillates relative to said first roller.

2. The system according to claim 1, wherein said at least one guide plate includes a plurality of guide plates are arranged in parallel.

3. The system according to claim 2, wherein said plurality of guide plates include sets of guide plates, wherein each said set of guide plates intermesh and move relative to one another.

4. The system according to claim 1, wherein said at least one guide plate has a forward edge that meets said curved edge at a salient point at said exit opening of said curved channel.

5. The system according to claim 4, wherein a slot is formed into said at least one guide plate from said forward edge.

6. The system according to claim 5, further including a stationary pin that extends into said slot.

7. The system according to claim 3, wherein said sets of guide plates are moved by eccentric shafts that rotate and displace said sets of guide plates.

8. The system according to claim 1, wherein said curved edge of said at least one guide plate is textured with protrusions.

9. The system according to claim 1, further including an auger screw that leads into said wide entrance opening of said curved channel.

10. A method of processing powdered materials, comprising:

providing a first roller;

providing a second roller, wherein a compression zone is disposed between said first roller and said second roller;

positioning at least one guide plate proximate said first roller, wherein said at least one guide plate has a curved edge that face said first roller, and wherein a curved channel is formed between said curved edge and said first roller;

introducing said powdered material into said curved channel, wherein said curved channel directs said powdered material into said compression zone between said first roller and said second roller; and oscillating said at least one guide plates relative to said first roller, wherein said at least one guide plate continuously shears and disturbs said powdered material as said powdered material advances through said curved channel.

11. The method according to claim 10, wherein said curved channel tapers from a wide entrance opening to a narrower exit opening that leads into said compression zone.

12. The method according to claim 10, wherein said at least one guide plate includes a plurality of guide plates are arranged in parallel.

13. The method according to claim 12, wherein said plurality of guide plates are in sets, wherein said sets oscillate out of phase with one another.

14. The method according to claim 10, wherein said at least one guide plate has a forward edges that meets said curved edge at a salient point, wherein said salient point engages said powdered material passing through said curved channel.

15. The method according to claim 14, further including providing a slot in said forward edge of said at least one guide plate that engages a guide pin as said at least one guide plate oscillates.

16. The method according to claim 12, wherein at least some of said plurality of guide plates are oscillated in sets by eccentric shafts that rotate and displace said sets.

17. The method according to claim 10, wherein said curved edge of said at least one guide plate is textured with protrusions that contact said powdered material as said at least one guide plate oscillates.

18. The method according to claim 11, further including providing an auger screw to advance said powdered material into said wide entrance opening of said curved channel.

* * * * *